United States Patent Office 2,979,879
Patented Apr. 18, 1961

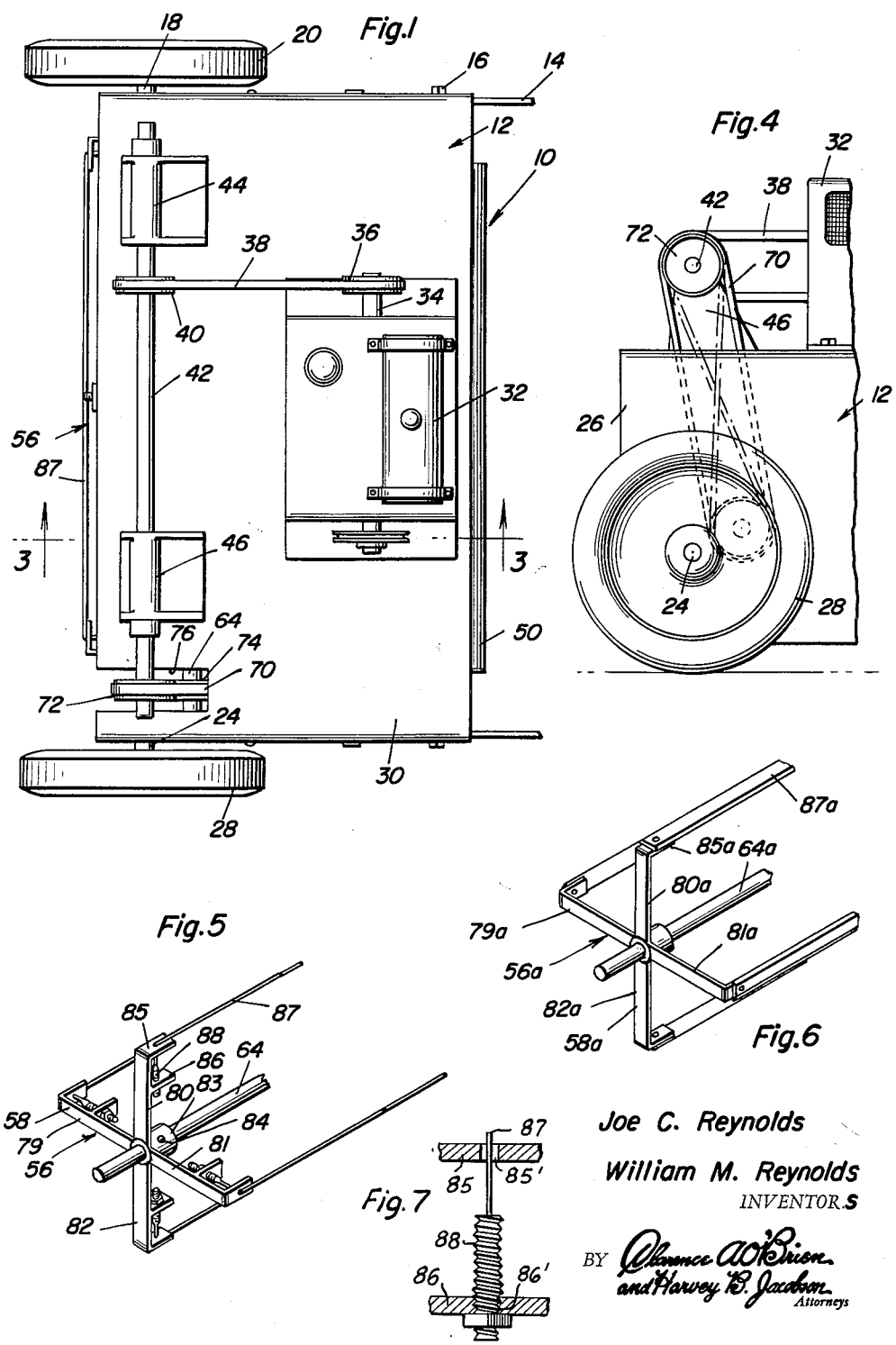

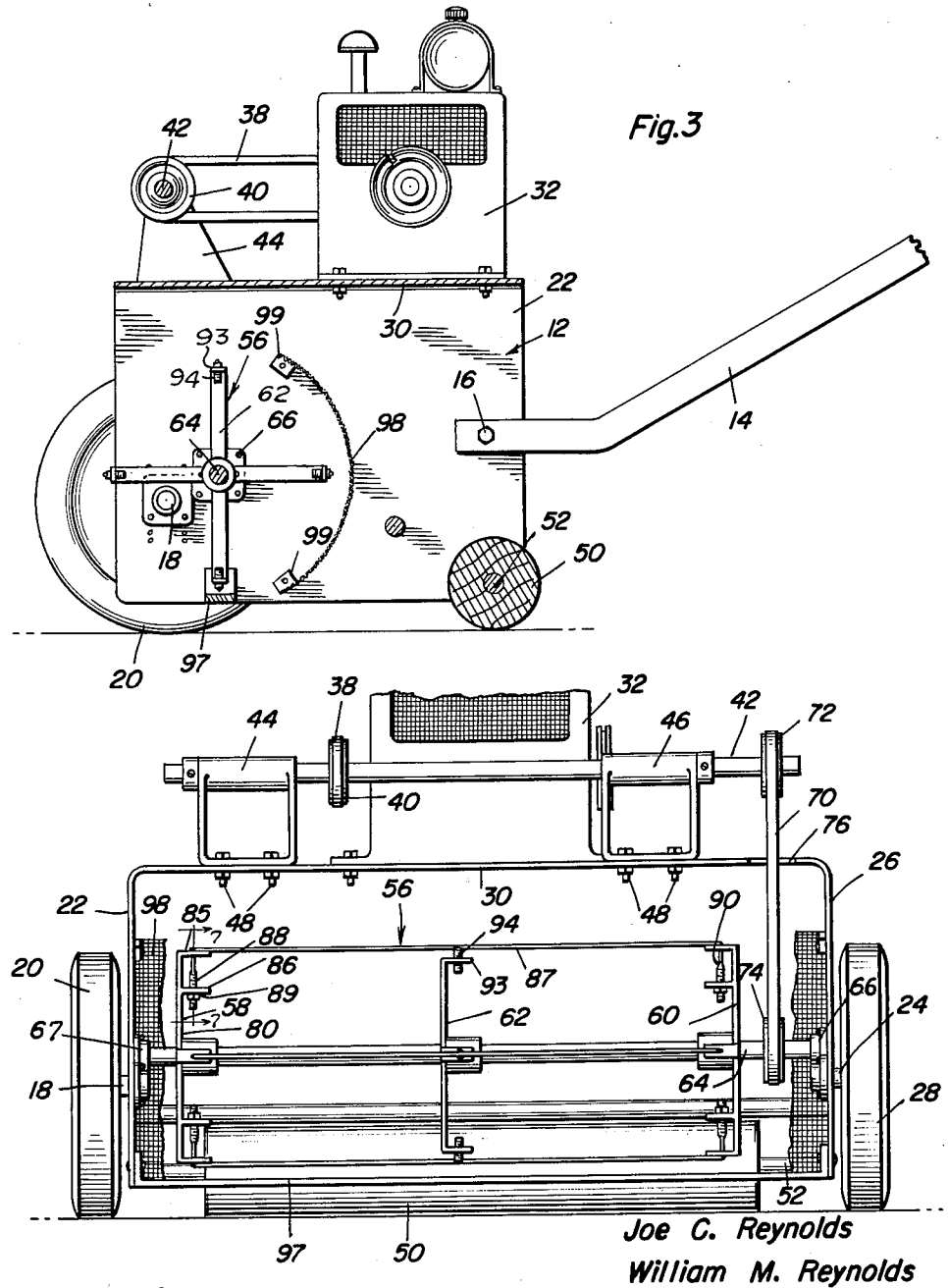

2,979,879

REEL MOWER WITH MULCHING MEANS

Joe C. Reynolds, 207 Stratford, and William M. Reynolds, 1605 Hewitt, both of Houston, Tex.

Filed June 25, 1958, Ser. No. 744,367

10 Claims. (Cl. 56—26)

This invention relates to lawn mowers and particularly to a reel type lawn mower providing improvements over both the rotary and the conventional reel types by having the reel operate on the same principle as the rotary type mower blade.

An object of the invention is to provide a lawn mower with a reversible reel, the reel driven by an electric or gasoline motor at a high rate of speed and adapted to cut the grass by striking the grass at this high rate of speed, not relying on the ordinary shearing action of reel type lawn mowers.

A lawnmower constructed in accordance with the invention is capable of having the reel reverse its direction of rotation. Normally the reel turns in a direction opposite to the direction of rotation of a conventional reel type lawn mower. The reason for reversing the direction is to add a removable mulching bar and mulching screen; the lawn mower will then cut heavy grass and weeds and chop them into a mulch that makes a suitable fertilizer. Although the mulching bar is set directly beneath the reel in much the same way as a conventional stationary cutter bar of a reel type lawn mower, it is spaced from the rotary reel blades and does not have the same shearing action as a reel type lawn mower. The mulching screen located adjacent to the reel of the lawn mower is spaced approximately a similar distance from the reel as the mulching bar and serves the same purpose as the mulching bar. The lawn mower has interchangeable blades to improve on the cutting service. A steel bar type blade may be used for high coarse grass and weeds while a steel wire blade may be used for simple work, such as golf course greens. The lawn mower is equipped with both types of blades although they are interchangeably usable. In addition, the lawn mower is so constructed that some models of commercially available edgers may be attached thereby resulting in a saving to the purchaser since his lawn mower, then, can be well used for edging as well as mowing.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a fragmentary top view of a lawn mower constructed in accordance with the invention.

Figure 2 is a front view of the lawn mower in Figure 1.

Figure 3 is a sectional view taken on the line 3—3 of Figure 1.

Figure 4 is a fragmentary elevational view showing in dotted lines, a second position of the drive belt for the reel of the lawn mower, indicating that the reel may be actuated in a clockwise or counterclockwise direction.

Figure 5 is a fragmentary perspective view of the reel showing the wire type of blades therein.

Figure 6 is a fragmentary perspective view showing the reel with the steel bar type blade therein.

Figure 7 is an enlarged fragmentary sectional view taken on the line 7—7 of Figure 2.

In the accompanying drawings there is a lawn mower 10 constructed in accordance with the invention. This lawn mower consists of a frame 12 that has a handle 14 attached either adjustably or fixedly to the rear part thereof, for instance by bolts 16. A front axle 18 for wheel 20 is attached to side 22 of the frame, while front axle 24 is attached to side 26 of the frame and it supports wheel 28. The frame is approximately U-shaped when viewed from the front or the rear having sides 22 and 26 together with a top panel 30 on which the source of power is attached. An electric motor may be used, although it is preferred that an internal combustion engine 32 be adopted as the source of motive power for the lawn mower.

The engine itself is conventional and has a shaft 34 protruding therefrom on which pulley 36 is secured. A belt 38 is entrained over pulley 36 and engaged with pulley 40 that is attached to jack shaft 42. The jack shaft is carried in bearings 44 and 46 secured to the top panel 30 of frame 12, the bearings preferably being at the top ends of short stanchions which can be bolted by bolts 48 in place on the top panel 30 of the frame.

The rear part of the frame has a roller 50 mounted for rotation on axle 52, the latter attached to sides 22 and 26 of frame 12. The roller 50 cooperating with the two wheels 20 and 28 support the lawn mower on the surface that is to be mowed. Roller 50, and wheels 20 and 28 are free turning, although it is within the purview of the invention to power the lawn mower from jack shaft 42 by attaching an additional pulley and belt thereto and to one or both of the wheels or by attaching a conventional chain drive to jack shaft 42 and one or both of the wheels. A conventional throttle and clutch would then be used. A typical conventional power drive line is shown in U.S. Patent No. 2,680,947.

Reel 56 and its actuation constitutes an important part of the invention. The reel 56 is made of two end frames 58 and 60 together with an intermediate frame 62, all of the frames being attached to reel spindle 64. The reel spindle is mounted for rotation in bearings 66 and 65 carried by the sides 22 and 26 of frame 12. The reel is rotated by belt 70 that is engaged with pulley 72 on jack shaft 42 and that is engaged with pulley 74 attached to reel shaft 64. The belt 70 is passed through an opening 76 in the top panel 30 of the frame and is reversible on the jack shaft (see dotted line representation in Figure 4) so that the reel 56 can be rotated either in a clockwise or counterclockwise direction for the purposes mentioned previously.

The three frames 58, 60 and 62 are each constructed very much alike. They are made of crossed arms arranged at right angles to each other, there being arms 79, 80, 81 and 82 for reel 56 (Figure 5), and these protrude radially from a hub 83 attached to the reel shaft 64 by conventional fastening structure, for instance a setscrew 84. The ends of each of the four mentioned arms are constructed the same. Arm 80 has a pair of parallel brackets 85 and 86 spaced from each other and at right angles to the general plane of arm 80. A tapped opening 86′ is in bracket 86 while a smooth bore opening 85′ is in bracket 85. Wire blade 87 has a threaded rod 88 at one end that can be threaded in tapped opening in bracket 86 or simply passed through the opening in that bracket and held in place by a nut 89 on threaded rod 88 (Figure 2). The wire 87 is threaded through the opening in bracket 85 and extends lengthwise of shaft 64, terminating in means 90 at the opposite end of wire 87, which means are identical to the pair of brackets 85 and 86, arm 80, threaded rod 88 and nut 89, for holding the end of the wire blade firmly attached in place on the reel frame 58 but in an adjustable manner so that the tension in the wire can be varied. Frame 62 exerts a support function on the wire blade 87 intermediate the ends thereof. The frame 62 is made of crossed arms in a manner identical to the frame 58, but there is only a single bracket, for instance bracket 93 (Figure 2) right angularly disposed at the end of each of the arms of frame 62. Threaded stud 94 is in a tapped opening in bracket 83 and has a small slot in its outer end to form a cradle within which the wire blade 87 nests.

There are four wire blades shown in Figure 5, this being for reel 56. Reel 56a has three frames, the same as reel 56, and each frame is approximately the same as the corresponding frames for reel 56. Frame 58a has four arms at right angles to each other, the arms being 80a, 81a, 82a and 79a. Instead of wire blades, there are flat steel blades 87a, each being identical and extending lengthwise of reel shaft 64a. There is a single bracket 85a at the end of arm 80a to which steel blade 87a is fastened, for instance by a bolt or rivet depending on whether the blade is to be separable for sharpening or not. The extremities of each of the other arms of frame 58a are the same, and the frames are attached to shaft 64a in the same way that the frames of reel 56 are attached to their shaft 64.

Although the lawn mower will operate without mulching bar 97, and operate very effectively, the mulching bar is added. It is a straight and essentially flat bar extending transversely across the sides of the frame 12 and attached thereto, for instance by bolts. It is spaced approximately one inch from the blades of either of the reels, depending on which is used so that there is definitely no shearing action of the type which is known in either the silent or non-silent reel lawn mowers. The mulching bar serves to form a mulch when the reel is operated in a counter-clockwise direction which is opposite to normal clockwise operation for cutting purposes in the use of our lawn mower. The same holds true for the mulching screen 98. Screen 98 is constructed as a segment of a cylinder and on an arc whose radius is approximately one inch greater than the radius of the circle described by the blades of the reel. Mounting ears 99 extend at right angles to the surface of the mulching screen, which may be hardware cloth of rather wide mesh, and are secured to the sides 22 and 26 of frame 12 by standard fasteners, as bolts.

The use and operation of the invention has been described previously. However, it is understood that various changes, alterations, revisions and reorganization of parts may be made without departing from the scope of the appended claims.

What is claimed as new is as follows:

1. A lawn mower to selectively cut and mulch, said mower comprising a frame, an engine carried by said frame, a jack shaft, bearings attached to said frame and supporting said jack shaft for rotation, means drivingly connecting said engine to said jack shaft, a pair of wheels, means mounting said wheels on said frame for rotation and at least partially supporting said frame for movement over a surface that is to be moved, a reel having a reel shaft, means mounting said reel shaft for rotation on said frame, mulching means mounted on said frame, means drivingly connected with said drive shaft and said reel shaft for rotating said reel in a selected clockwise direction for cutting and in a counterclockwise direction for mulching by cooperation with said mulching means, said reel having straight blades extending lengthwise and spaced from said reel shaft, and means supporting said reel blades radially spaced from said reel shaft and parallel thereto.

2. The lawn mower of claim 1 wherein said means supporting said reel blades include a pair of frames secured to said reel shaft and spaced from each other, each frame having a plurality of radial arms, means including at least one bracket at approximately right angles to the general plane of said arms for attaching said blades to said arms.

3. The lawn mower of claim 1 wherein said mulching means includes a mulching bar attached to said frame and extending approximately parallel to said reel shaft and spaced from the blades of said reel at all positions of rotation of said reel.

4. The lawn mower of claim 3 where said mulching means includes a mulching screen carried by said frame and which is curved in cross-section and that extends approximately parallel to said reel shaft and spaced from the blades of said reel.

5. In a lawn mower which includes a frame, a motor carried by said frame, a reel including a reel shaft having a plurality of reel blades approximately parallel to and uniformly spaced from said shaft, said reel blades being straight from end to end thereof, means including bearings on said frame mounting said reel shaft for rotation, mechanical means drivingly connected with said motor and said reel shaft for rotating said reel in a clockwise direction for normal cutting and for selectively rotating said reel shaft in a counter-clockwise direction for mulching by cooperation with mulching means mounted on said frame.

6. The lawn mower of claim 5 wherein said mulching means includes a mulching bar attached to said frame and extending lengthwise of said reel shaft and spaced from said reel blades, said mulching bar cooperating with said blades to mulch the grass when said reel is actuated in said counterclockwise direction.

7. In a lawn mower which includes a frame, a motor carried by said frame, a reel including reel shaft having a plurality of reel blades approximately parallel to and uniformly spaced from said shaft, said reel blades being straight from end to end thereof, means including bearings on said frame mounting said reel shaft for rotation, mechanical means drivingly connected with said motor and said reel shaft for rotating said reel in a clockwise direction for normal cutting and for selectively rotating said reel shaft in a counter-clockwise direction for mulching, a mulching bar attached to said frame and extending lengthwise of said reel shaft and spaced from said reel blades at all positions of said reel during rotation of said reel, a mulching screen carried by said frame and extending lengthwise of said reel and located behind said reel, said muching bar and mulching screen cooperating with said reel blades when said reel blades are actuated in a counter-clockwise direction to mulch the grass and other cuttings.

8. In a lawn mower which includes a frame, a motor carried by said frame, a reel including a reel shaft having a plurality of reel blades approximately parallel to and uniformly spaced from said shaft, said reel blades being straight from end to end thereof, means including bearings on said frame mounting said reel shaft for rotation, mechanical means drivingly connected with said motor and said reel shaft for rotating said reel in a clockwise direction for normal cutting and for selectively rotating said reel shaft in a counter-clockwise direction for mulching, a mulching bar attached to said frame and extending lengthwise of said reel shaft and spaced from said reel blades at all positions of said reel during rotation of said reel, a mulching screen carried by said frame and extending lengthwise of said reel and located behind said reel, said mulching bar and mulching screen cooperating with said reel blades when said reel blades are actuated in a counter-clockwise direction to mulch the grass and other cuttings, said mechanical means drivingly connected with said motor and said reel shaft including a pulley attached to said reel shaft, a flexible belt entrained around said pulley, and said belt adapted to be crossed for obtaining direction reversal of the rotation of said reel shaft.

9. A cutting and mulching lawn mower, comprising, a frame mounting, power means, reel means rotatably mounted on said frame, removable cutting means mounted on said reel means, mulching means secured to said frame and horizontally disposed in spaced relation to and beneath said cutting means, and reversible drive means operatively connecting said power means to said reel means.

10. The lawn mower as defined in claim 9, further including a screen carried by said frame rearwardly disposed with respect to said reel means, cutting means and mulching means.

References Cited in the file of this patent

UNITED STATES PATENTS

| | | |
|---|---|---|
| 974,219 | Werner | Nov. 1, 1910 |
| 2,604,747 | Bash | July 29, 1952 |
| 2,669,083 | Hinson | Feb. 16, 1954 |
| 2,680,947 | Weimer | June 15, 1954 |
| 2,685,774 | Williams | Aug. 10, 1954 |
| 2,759,321 | Force | Aug. 21, 1956 |